US009988035B2

(12) United States Patent
Kim

(10) Patent No.: US 9,988,035 B2
(45) Date of Patent: Jun. 5, 2018

(54) ELECTRICALLY CONTROLLED BRAKE SYSTEM IN A VEHICLE AND METHOD THEREOF

(71) Applicant: MANDO CORPORATION, Pyeongtaek-si, Gyeonggi-do (KR)

(72) Inventor: Hak-Burm Kim, Suwon-Si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 14 days.

(21) Appl. No.: 15/241,811

(22) Filed: Aug. 19, 2016

(65) Prior Publication Data
US 2017/0050629 A1    Feb. 23, 2017

(30) Foreign Application Priority Data
Aug. 20, 2015    (KR) .................. 10-2015-0117117

(51) Int. Cl.
| B60T 17/22 | (2006.01) |
| B60T 13/14 | (2006.01) |
| B60T 13/68 | (2006.01) |
| B60T 7/04 | (2006.01) |
| B60T 13/66 | (2006.01) |
| B60T 8/40 | (2006.01) |

(52) U.S. Cl.
CPC ............ B60T 17/221 (2013.01); B60T 7/042 (2013.01); B60T 8/4081 (2013.01);
(Continued)

(58) Field of Classification Search
CPC ........ B60T 7/042; B60T 8/341; B60T 8/4036; B60T 8/4081; B60T 8/4266;
(Continued)

(56) References Cited

U.S. PATENT DOCUMENTS

| 6,007,163 A * | 12/1999 | Sawada ................ B60T 8/3275 303/116.2 |
| 2002/0101114 A1* | 8/2002 | Kamiya ................ B60T 8/3275 303/114.1 |

(Continued)

*Primary Examiner* — Robert A. Siconolfi
*Assistant Examiner* — San M Aung
(74) *Attorney, Agent, or Firm* — McDermott Will & Emery LLP

(57) ABSTRACT

Disclosed herein is an electrically controlled brake system. The electrically controlled brake system includes a motor and a pump, a master cylinder, a reservoir that is coupled to an upper portion of the master cylinder and in which a brake fluid is stored, an accumulator in which a brake fluid pumped from the reservoir is stored by the motor and the pump, a hydraulic path that connects the accumulator and each of wheel cylinders, an apply valve and a release valve that are provided on the hydraulic path and control a hydraulic pressure transferred from the accumulator to each of the wheel cylinders, a pedal simulator including a simulation chamber connected to the master cylinder and configured to store a brake fluid flowing from the master cylinder to provide a reaction force of a brake pedal, and a simulation valve provided at an inlet of the simulation chamber, a backup path that is connected to the hydraulic path and connects the master cylinder and each of the wheel cylinders, a cut valve that is provided on the backup path and blocks the backup path, a first pressure sensor that is provided on the backup path and detects a pressure of the pedal simulator, a second pressure sensor that is provided on the hydraulic path and detects a pressure of the hydraulic path and an electronic control unit (ECU) that determines whether a mechanical leak failure of the cut valve occurs using a correlation between the pressure of the pedal simulator detected by the first pressure sensor and the pressure of the hydraulic path detected by the second pressure sensor.

13 Claims, 6 Drawing Sheets

(52) U.S. Cl.
CPC .......... *B60T 13/146* (2013.01); *B60T 13/147* (2013.01); *B60T 13/662* (2013.01); *B60T 13/686* (2013.01); *B60T 2270/402* (2013.01); *B60T 2270/403* (2013.01); *B60T 2270/82* (2013.01)

(58) Field of Classification Search
CPC .... B60T 13/146; B60T 13/147; B60T 13/662; B60T 13/686; B60T 17/21; B60T 17/22; B60T 17/221; B60T 2270/82; B60T 2270/402; B60T 2270/403
USPC ............... 303/10, 11, 122.1, 122.04, 122.05, 303/122.09; 701/29.1, 33.7, 33.9, 34.1
See application file for complete search history.

(56) References Cited

U.S. PATENT DOCUMENTS

| | | | | |
|---|---|---|---|---|
| 2011/0006596 A1* | 1/2011 | Leiber | ........................ | B60T 8/00 303/13 |
| 2012/0256477 A1* | 10/2012 | Miyazaki | .............. | B60T 8/4081 303/6.01 |
| 2015/0130266 A1* | 5/2015 | Kim | ...................... | B60T 13/662 303/10 |
| 2015/0367828 A1* | 12/2015 | Oosawa | ................ | B60T 17/221 303/6.01 |
| 2016/0082937 A1* | 3/2016 | Nakaoka | ................. | B60T 8/885 303/15 |

\* cited by examiner

ELECTRICALLY CONTROLLED BRAKE SYSTEM IN A VEHICLE AND METHOD THEREOF

CROSS-REFERENCE TO RELATED APPLICATION

This application claims the benefit of Korean Patent Application No. 10-2015-0117117, filed on Aug. 20, 2015 in the Korean Intellectual Property Office, the disclosure of which is incorporated herein by reference.

BACKGROUND

1. Field

Embodiment of the present disclosure relates to an electrically controlled brake system, and more particularly, to an electrically controlled brake system that maintains hydraulic pressure supplied to each wheel cylinder using a cut valve.

2. Description of the Related Art

Recently, active hydraulic booster (AHB) systems are installed in vehicles such as hybrid vehicles, fuel cell vehicles, and electric vehicles.

Generally, an electrically controlled bake system, for instance, an AHB system, is a brake system in which, when a driver steps on a brake pedal, an electronic control unit (ECU) which performs overall control of the system detects the stepping, generates a hydraulic pressure using a hydraulic power unit (HPU), supplies the hydraulic pressure to a master cylinder, transfers a brake hydraulic pressure to each wheel cylinder of wheels using an electronic stability control (ESC) system which controls a brake force of each wheel, and generates a brake force.

Such an AHB system generates a pressure needed to brake by controlling valves when a driver brakes. The valves used in valve control include an apply valve for supplying the hydraulic pressure to the wheel cylinders, a cut valve for maintaining the supplied hydraulic pressure, a release valve for discharging the hydraulic pressure supplied to the wheel cylinders, and a simulation valve for generating a pedal effort of the brake pedal.

When the AHB system operates normally and the driver steps on the pedal, the AHB system is operated by receiving a brake pedal signal, the apply valve is opened according to the operation of the AHB system, a high pressure brake fluid which filled an accumulator passes through the apply valve and is supplied to a booster circuit (BC), and a pressure of the BC is increased. Simultaneously, the cut valve is blocked and the brake pressure is maintained. In addition, while the simulation valve is opened, a pressure of a pedal simulator which corresponds to a reaction force of the brake pedal is generated by a spring in the pedal simulator being pushed by the hydraulic pressure in the master cylinder.

When a mechanical leak occurs in the cut valve which maintains the supplied hydraulic pressure, while the driver steps on the brake pedal and an input rod connected to the brake pedal is moved forward, an output rod of the master cylinder may strike the input rod due to the leaked hydraulic pressure. Therefore, a kick back in which a physical impact is transferred to the brake pedal connected to the input rod occurs due to the output rod striking the input rod. The driver may feel vibrations of striking the brake pedal due to the kick back phenomena, and thus, the driver may feel discomfort.

However, since a logic which determines whether a mechanical leak failure of the cut valve occurs is not implemented in a conventional case, the driver may feel discomfort or be threatened by an occurrence of the kick back phenomena when the failure actually occurs.

SUMMARY

Therefore, it is an aspect of the present disclosure to provide an electrically controlled brake system that detects a mechanical leak failure of a cut valve to prevent a kick back phenomena of a brake pedal due to the mechanical leak failure of the cut valve.

Additional aspects of the disclosure will be set forth in part in the description which follows and, in part, will be obvious from the description, or may be learned by practice of the disclosure.

In accordance with one aspect of the present invention, an electrically controlled brake system includes a motor and a pump, a master cylinder; a reservoir that is coupled to an upper portion of the master cylinder and in which a brake fluid is stored; an accumulator in which a brake fluid pumped from the reservoir is stored by the motor and the pump; a hydraulic path that connects the accumulator and each of wheel cylinders; an apply valve and a release valve that are provided on the hydraulic path and control a hydraulic pressure transferred from the accumulator to each of the wheel cylinders; a pedal simulator including a simulation chamber connected to the master cylinder and configured to store a brake fluid flowing from the master cylinder to provide a reaction force of a brake pedal, and a simulation valve provided at an inlet of the simulation chamber; a backup path that is connected to the hydraulic path and connects the master cylinder and each of the wheel cylinders; a cut valve that is provided on the backup path and blocks the backup path; a first pressure sensor that is provided on the backup path and detects a pressure of the pedal simulator; a second pressure sensor that is provided on the hydraulic path and detects a pressure of the hydraulic path; and an electronic control unit (ECU) that determines whether a mechanical leak failure of the cut valve occurs using a correlation between the pressure of the pedal simulator detected by the first pressure sensor and the pressure of the hydraulic path detected by the second pressure sensor.

The electronic control unit (ECU) may determine that a mechanical leak failure of the cut valve occurs when a pressure ratio of the detected pressure of the pedal simulator and the detected pressure of the hydraulic path is greater than a pressure ratio when the cut valve is normal, and when the detected pressure of the pedal simulator is greater than a preset first reference value.

The electronic control unit (ECU) may determine that a mechanical leak failure of the cut valve occurs when a ratio of the detected pressure of the pedal simulator and the detected pressure of hydraulic path is greater than a preset ratio, and when the detected pressure of the pedal simulator is greater than the preset first reference value.

The Electrically controlled brake system may further comprise a pedal stroke sensor that detects a pedal stroke of the brake pedal, wherein, as a target pressure corresponding to the pedal stroke detected by the pedal stroke sensor rises, the ECU decreases the preset ratio and increases the preset first reference value.

The Electrically controlled brake system may further comprise a warning unit that warns of a mechanical leak failure of the cut valve, wherein, when the failure of the cut valve is determined to occur, the ECU repeats re-driving of the cut valve and re-performing the determination of whether the failure of the cut valve occurs, and when the number of the re-drivings is equal to or greater than a preset number, the ECU warns of the mechanical leak failure of the cut valve through the warning unit.

The cut valve may further include a normally open solenoid valve which usually maintains an open state.

The electronic control unit (ECU) may determine that a mechanical leak failure of the cut valve occurs when a ratio of the pedal pressure value estimated from the detected pressure of the pedal simulator and the pedal pressure value detected by the pedal stroke sensor is greater than a preset multiple.

The electronic control unit (ECU) may apply a pattern current to the cut valve and re-determine whether the mechanical leak failure of the cut valve occurs when a mechanical leak failure of the cut valve is determined to occur.

The pattern current may include a pattern in which a current is increased linearly from a preset minimum current to a preset maximum current for a preset critical time.

In accordance with another aspect of the present invention, an electrically controlled brake system including an accumulator for storing a brake fluid pumped by a motor and a pump, a hydraulic path connecting the accumulator and each wheel cylinder, a pedal simulator having a simulation chamber connected to a master cylinder and configured to store a brake fluid flowing from the master cylinder to provide a reaction force of a brake pedal, and a simulation valve provided at an inlet of the simulation chamber, a backup path connected to the hydraulic path and connecting the master cylinder and each of the wheel cylinders, and a cut valve provided on the backup path and configured to block the backup path, the electrically controlled brake system may comprise a first pressure sensor that is provided on the backup path and detects a pressure of the pedal simulator; and a second pressure sensor that is provided on the hydraulic path and detects a pressure of the hydraulic path; and a pedal stroke sensor that detects a pedal stroke of the brake pedal; and an electronic control unit (ECU) that determines that a mechanical leak failure of the cut valve occurs when a ratio of the pressure of the pedal simulator detected by the first pressure sensor and the pressure of the hydraulic path detected by the second pressure sensor is greater than a preset ratio and when the detected pressure of the pedal simulator is greater than a preset value.

The electronic control unit (ECU) may determine that a mechanical leak failure of the cut valve occurs when a ratio of a pedal pressure value estimated from the pressure of the pedal simulator detected by the first pressure sensor and a pedal pressure value detected by the pedal stroke sensor is greater than a preset multiple.

The electronic control unit (ECU) may apply a pattern current to the cut valve and re-determines whether the mechanical leak failure of the cut valve occurs when the mechanical leak failure of the cut valve is determined to occur.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
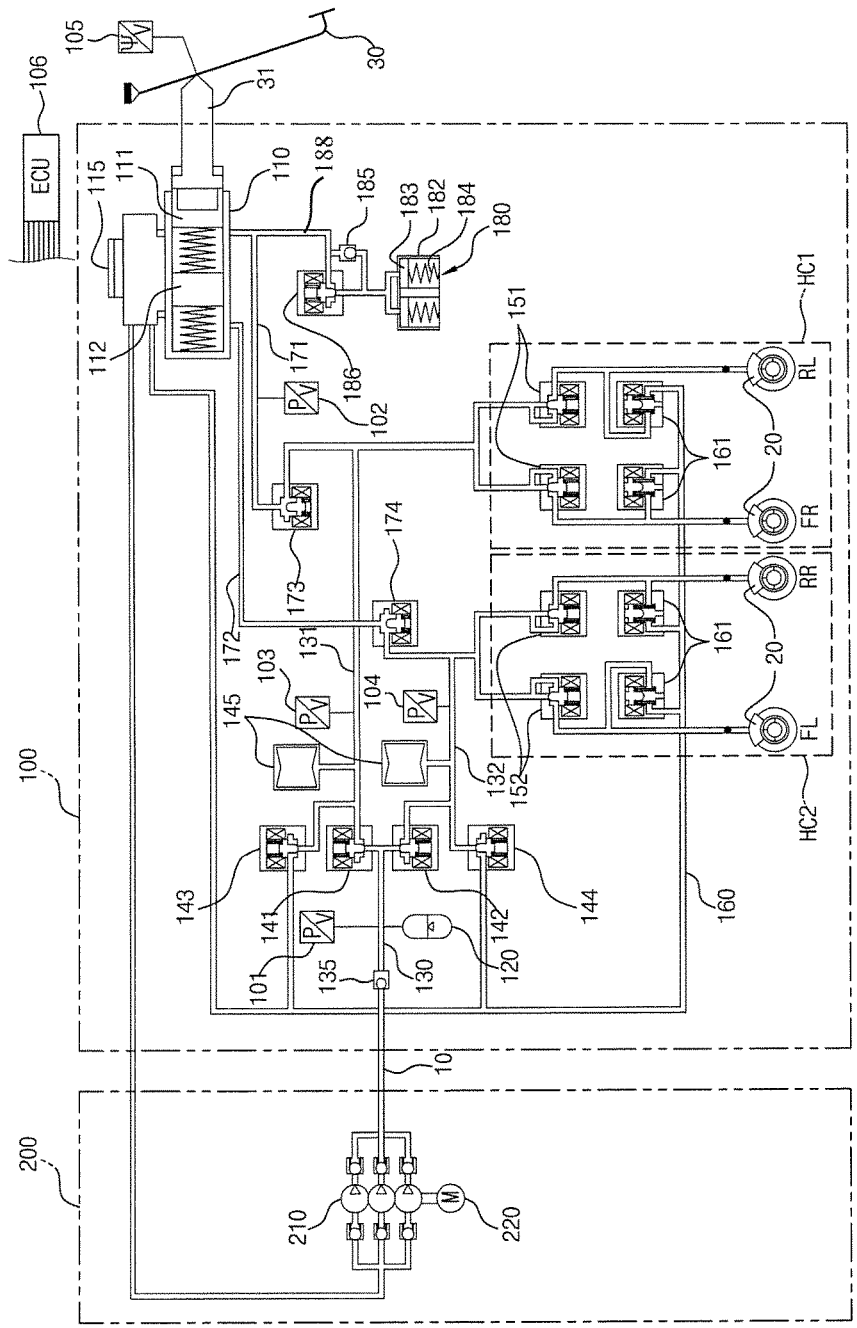
FIG. 1 is a hydraulic circuit diagram of an electrically controlled brake system according one embodiment of the present disclosure.

Hereinafter, embodiments of the present disclosure will be described in detail with reference to accompanying drawings. The accompanying drawings are examples which provide the concept of the present disclosure to those skilled in the art. The present disclosure is not limited to the accompanying embodiments, and may be implemented in different forms. Parts irrelevant to description are omitted in the drawings in order to clearly describe the present disclosure, and widths, lengths, and thicknesses of components in the drawings may be exaggerated for convenience of description. In this specification, like reference characters denote like components.

In this specification, the term "and/or" is used with the meaning of including at least one of the listed components. In addition, the terms "connected to" and "coupled to" are used with the meaning of including a component being directly connected to the other components or being indirectly connected through other components. Unless clearly indicated otherwise by context, singular forms include the plural forms thereof. In addition, the terms "comprise" or "comprising" when used herein, specify some stated components, steps, operations, and elements including one or more other components, steps, operations, and/or elements.

In the embodiment below, an electrically controlled brake system is described as only dealing with an active hydraulic booster (AHB) system.

FIG. 1 is a hydraulic circuit diagram of an electrically controlled brake system according one embodiment of the present disclosure.

Referring to FIG. 1, the electrically controlled brake system may be largely divided into two units which are a hydraulic control unit 100 and a power source unit 200.

The hydraulic control unit 100 includes a brake pedal 30 operated by a driver, a master cylinder 110 to which a force is transferred from the brake pedal 30, a reservoir 115 that is coupled to an upper portion of the master cylinder 110 to store oil, two hydraulic circuits HC1 and HC2 each connected to two wheels of wheels RR, RL, FR, and FL, an accumulator 120 in which a predetermined level of a pressure is stored, a pedal simulator 180 provided to be connected to the master cylinder 110 so as to provide a reaction force of the brake pedal 30, and a simulation valve 186 installed at a flow path 188 that connects the pedal simulator 180 and the reservoir 115.

In addition, the hydraulic control unit 100 may further include apply valves 141 and 142 respectively connected to the two hydraulic circuits HC1 and HC2 to control a pressure transferred from the accumulator 120 to wheel cylinders 20 installed at the wheels FL, FR, RL, and RR, release valves 143 and 144, pressure sensors 101, 102, 103, and 104, and the like.

The power source unit 200 includes a pump 210 that intakes oil from the reservoir 115 and discharges the oil to the accumulator 120 to generate a pressure at the accumulator 120 and a motor 220 for driving the pump 210.

The hydraulic control unit 100 and the power source unit 200 are connected by an external pipe 10. That is, the pump 210 of the power source unit 200 and the accumulator 120 of the hydraulic control unit 100 are connected by the external pipe 10. The reason why the power source unit 200 including the pump 210 and the motor 220 is provided as an additional unit is to isolate operating noise, and to integrate the master cylinder 110, the reservoir 115, and the pedal simulator 180 as a single unit and to include an electronic stability control (ESC) function and a function of a hydraulic power unit (HPU) in the hydraulic control unit 100 to reduce a weight of the AHB system and improve an installation space.

Hereinafter, structures and functions of components configuring the electrically controlled brake system will be more specifically described.

First, the master cylinder 110 includes a first piston 111 and a second piston 112 formed therein to be connected to the two hydraulic circuits and is provided to generate a hydraulic pressure by a pedal effort of the brake pedal 30. The master cylinder 110 is connected to the two hydraulic circuits HC1 and HC2. The reason why the master cylinder 110 is connected to the two hydraulic circuits is to secure safety during a failure. For example, one circuit of the two hydraulic circuits connected to the master cylinder 110 may be connected to the front-right wheel FR and the rear-left wheel RL, and the other circuit may be connected to the front-left wheel FL and the rear-right wheel RR.

The reservoir 115 in which oil is stored is installed above the master cylinder 110, and oil discharged through an outlet formed at a lower portion of the master cylinder 110 is introduced to each of the wheel cylinders 20 installed at each of the wheels RR, RL, FR, and FL.

Meanwhile, an undescribed reference numeral 31 is an input rod installed at the brake pedal 30 to transfer a pedal effort to the master cylinder 110.

At least one pump 210 is provided to pump oil introduced from the reservoir 115 at a high pressure and to generate a brake pressure, and the motor 220 for supplying a driving force to the pump 210 is provided at one side of the pump 210.

The accumulator 120 is provided at an outlet of the pump 210 and in which the high pressure oil generated by driving the pump 210 is temporarily stored. That is, the accumulator 120 is connected to the pump 210 through the external pipe 10. Here, a check valve 135 is installed at the external pipe 10 to prevent the high pressure oil stored in the accumulator 120 from back-flowing.

A first pressure sensor 101 is provided at an outlet of the accumulator 120 to measure a pressure of the oil in the accumulator 120. Here, the oil pressure measured by the first pressure sensor 101 is compared with a set pressure by an electronic control unit (ECU). When the measured pressure is less than the set pressure, the ECU drives the pump 210 using the motor 220 to intake the oil in the reservoir 115 and to fill the accumulator 120 with the oil.

A connection path 130 is connected to the external pipe 10 to transfer brake oil stored in the accumulator 120 to the wheel cylinders 20. The connection path 130 includes a first inflow path 131 connected to the first hydraulic circuit HC1 and a second inflow path 132 connected to the second hydraulic circuit HC2. The first hydraulic circuit HC1 is connected to the front-right wheel FR and the rear-left wheel RL of a vehicle, and the second hydraulic circuit HC2 is connected to the front-left wheel FL and the rear-right wheel RR.

The first inflow path 131 is provided with a first apply valve 141 and a first release valve 143 for controlling the brake oil stored in the accumulator 120. The second inflow path 132 is provided with a second apply valve 142 and a second release valve 144 for controlling the brake oil stored in the accumulator 120. That is, the brake oil in the accumulator 120 may be transferred to each of the wheel cylinders 20 through the first and second inflow paths 131 and 132.

Each of the first and second apply valves 141 and 142 and the first and second release valves 143 and 144 may include a normally closed type solenoid valve which usually maintains a closed state. Accordingly, when a driver steps on the brake pedal 30, the first and second apply valves 141 and 142 are opened and the brake oil stored in the accumulator 120 is transferred to the wheel cylinders 20.

The first inflow path 131 is provided with a second pressure sensor 103. The second pressure sensor 103 detects a pressure of brake oil transferred to the first inflow path 131. The pressure detected by the second pressure sensor 103 corresponds to pressures of the wheel cylinders 20 of the front-left wheel and the rear right wheel.

The second inflow path 132 is provided with a third pressure sensor 104. The third pressure sensor 104 detects a pressure of brake oil transferred to the second inflow path 132. The pressure detected by the third pressure sensor 104 corresponds to pressures of the wheel cylinders 20 of the front-right wheel and the rear left wheel.

First inflow valves 151 are provided between the first inflow path 131 and the wheel cylinders 20 which are connected, and second inflow valves 152 are provided between the second inflow path 132 and the wheel cylinders 20 which are connected.

Each of the first inflow valves 151 may include a normally open type solenoid valve which usually maintains an open state. The first inflow valves 151 adjust an amount of brake oil provided from the accumulator 120 to the wheel cylinders 20 according to the opening of first apply valve 141. The second inflow valves 152 may be configured to perform the same operation as that of the first inflow valves 151.

In addition, the hydraulic control unit 100 may include a return path 160 that connects the wheel cylinders 20 and the master cylinder 110. Outflow valves 161 are provided on the return path 160 to discharge oil in the wheel cylinders 20 to the reservoir 115. The outflow valve 161 may include a normally closed type solenoid valve which usually maintains the closed state.

In addition, the hydraulic control unit 100 may further include pulsation dampers 145 provided on each of the first and second inflow paths 131 and 132 to minimize a pressure pulsation. The pulsation dampers 145 are units that may temporarily store oil to decrease pulses generated between the apply valves 141 and 142 and the release valves 143 and 144 and inflow valves 151 and 152.

A first backup path 171 and a second backup path 172 form flow paths between the master cylinder 110 and the wheel cylinders 20 such that emergency braking is allowed. Here, the emergency braking provides a brake pressure to each of the wheel cylinders by operating the brake pedal when an integrated electrically controlled hydraulic brake system fails.

A first cut valve 173 is provided on the first backup path 171 to open or close the first backup path 171. A second cut valve 174 is provided on the second backup path 172 to open or close the second backup path 172.

The first backup path 171 is connected to the first inflow path 131 through the first cut valve 173, and the second backup path 172 is connected to the second inflow path 132 through the second cut valve 174. The first and second backup paths 171 and 172 are blocked by the respective first and second cut valves 173 and 174 when braking in a normal state.

Each of the first and second cut valves 173 and 174 may include a normally open solenoid valve which usually maintains an open state.

A fourth pressure sensor 102 that detects a pressure of the pedal simulator 180 (or a pressure of the master cylinder 110) is provided between the first cut valve 173 and the master cylinder 110. The pressure detected by the fourth pressure sensor 102 corresponds to a pressure of the pedal simulator or a pressure of the master cylinder 110.

The pedal simulator 180 is provided between the fourth pressure sensor 102 and the master cylinder 110 to generate a pedal effort of the brake pedal 30.

The pedal simulator 180 includes a simulation chamber 182 provided to store oil discharged from the outlet of the master cylinder 110, and a simulation valve 186 provided at an inlet of the simulation chamber 182. The simulation chamber 182 is formed to have displacement in a predetermined range due to oil introduced into the simulation chamber 182 by including a piston 183 and an elastic member 184. The simulation valve 186 includes a normally closed solenoid valve that usually maintains a closed state and opens to transfer brake oil to the simulation chamber 182 when a driver steps on the brake pedal 30.

In addition, a simulation check valve 185 is provided between the pedal simulator 180 and the master cylinder 110, that is, between the pedal simulator 180 and the simulation valve 186, and the simulation check valve 185 is connected to the master cylinder 110. The simulation check valve 185 is provided to cause a pressure according to a pedal effort of the brake pedal 30 to be transferred to the pedal simulator 180 only through the simulation valve 186. Such a simulation check valve 185 may include a check valve for a pipe without a spring such that a residual pressure of the pedal simulator 180 is restored when the pedal effort of the brake pedal 30 is released.

Meanwhile, a pedal stroke sensor 105 that detects a pedal stroke of the brake pedal 30 is provided at the brake pedal 30. The pedal stroke sensor 105 detects a pedal stroke of the brake pedal 30 which changes when the driver steps on the brake pedal 30.

In addition, the electrically controlled brake system performs overall control using an ECU 106.

Figure 2:
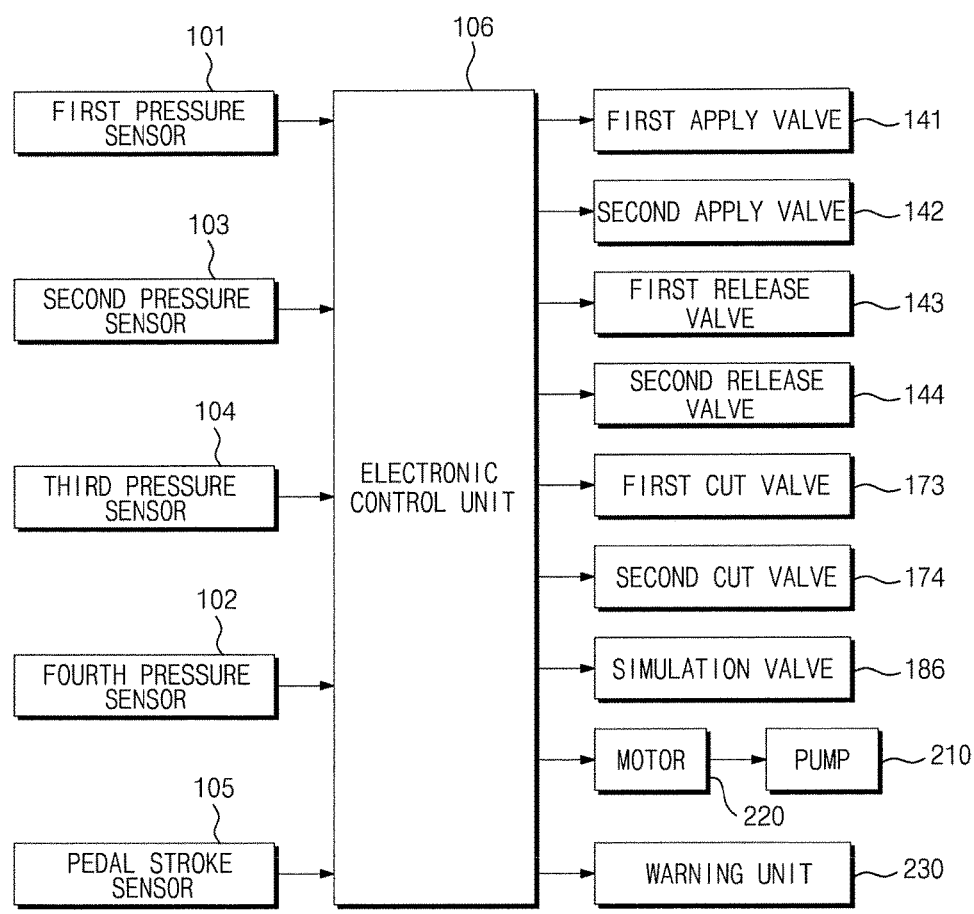
FIG. 2 is a schematic control block diagram of the electrically controlled brake system according to one embodiment of the present disclosure.

FIG. 2 is a schematic control block diagram of the electrically controlled brake system according to one embodiment of the present disclosure Referring to FIG. 2, the electrically controlled brake system includes the ECU 106 that performs overall control.

The first to fourth pressure sensors 101 to 104 and the pedal stroke sensor 105 are electrically connected to an input of the ECU 106.

The first and second apply valves 141 and 142, the first and second release valves 143 and 144, the first and second cut valves 173 and 174, the simulation valve 186, the motor 220, and a warning unit 230 are electrically connected to an output of the ECU 106.

The warning unit 230 warns a driver of a mechanical leak failure of the cut valves 173 and 174. The warning unit 230 is implemented by a visual component, such as a warning lamp, or an acoustic component, such as a buzzer, installed at a suitable place inside a vehicle, and operates the warning lamp or the buzzer to warn of a mechanical leak failure of the cut valves 173 and 174 according to a control signal of the ECU 106. A speaker may be used as the acoustic component for the warning unit 230, and such a speaker may be a speaker of an audio system included inside the vehicle or may also be a speaker separately provided at a suitable place inside the vehicle.

The ECU 106 directly generates a hydraulic pressure using the motor 220 on the basis of information of pressures detected by the first to fourth pressure sensor 101 to 104 and information of a pedal stroke of the brake pedal 30 detected by the pedal stroke sensor 105, and performs AHB control that controls a braking force of each of the wheels using the hydraulic pressure.

Meanwhile, while the AHB system operates, the ECU 106 determines whether a mechanical leak failure of the cut valves 173 and 174 occurs using information of pressures of the second pressure sensor 103, the third pressure sensor 104, and the fourth pressure sensors 102. When a mechanical leak failure of the cut valves 173 and 174 is determined to have occurred, the ECU 106 warns the driver of the mechanical leak failure of the cut valves 173 and 174 through the warning unit 230. At this point, the ECU 106 prohibits all valves of the AHB system from operating to cause each of the wheels to be directly braked by a force of the driver when the driver steps on the brake pedal, and therefore, a kick back phenomena of the brake pedal due to a mechanical leak failure of the cut valves 173 and 174 may be prevented.

Hereinafter, an operation of the ECU 106 will be described in more detail.

Figure 3:
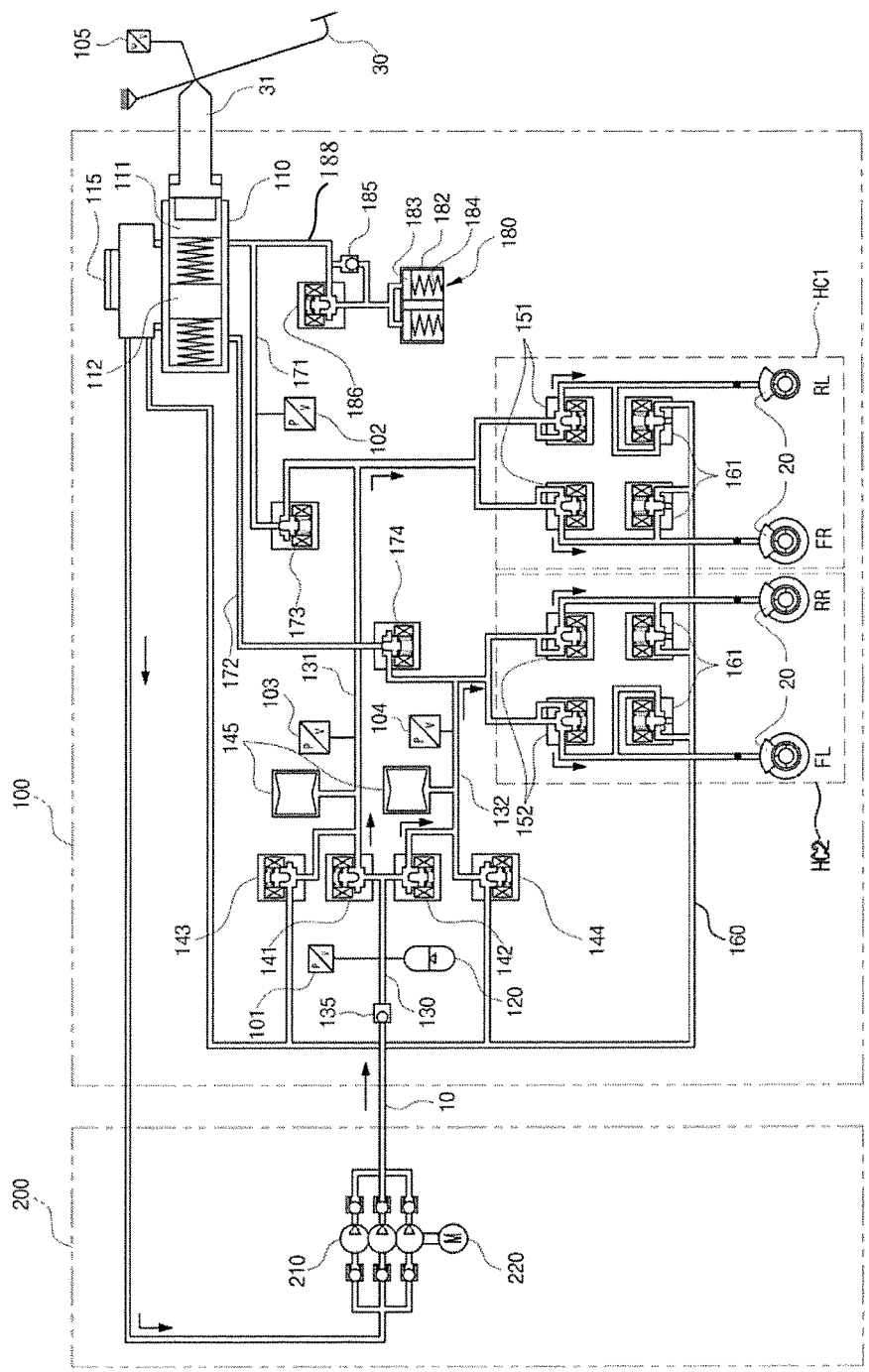
FIG. 3 is a hydraulic circuit diagram for describing a hydraulic flow of the electrically controlled brake system according to one embodiment of the present discloser during normal braking.

FIG. 3 is a hydraulic circuit diagram for describing a hydraulic flow of the electrically controlled brake system according to one embodiment of the present discloser during normal braking.

Referring to FIG. 3, when a user steps on the brake pedal 30, the ECU 106 detects a pedal stroke of the brake pedal 30 from the pedal stroke sensor 105, determines a target pressure preset to correspond to the pedal stroke of the brake pedal 30, operates the pump 210 using the motor 220 to generate the determined target pressure, and thus fills the accumulator 120 with a high pressure brake oil. Here, the target pressure may be an amount of braking needed by a driver corresponding to the pedal stroke of the brake pedal 30 minus an amount of restoring braking. Here, a level of pressure increase or decrease may be determined.

The ECU 106 opens the first and second apply valves 141 and 142 to supply the high pressure brake oil that filled the accumulator 120 to each of the wheel cylinders 20. Here, the ECU 106 detects pressures of the pressure sensors 103 and 104 provided on the first and second hydraulic paths 131 and 132, and controls operations of the apply valves 141 and 142 based on the detected pressures.

The ECU 106 opens the apply valves 141 and 142 and simultaneously closes the first and second cut valves 173 and 174 respectively provided on the first and second backup paths 171 and 172 to block the first and second backup paths 171 and 172. Accordingly, the brake oil that passes through the first and second apply valves 141 and 142 to be supplied to each of the wheel cylinders 20 does not back-flow toward the first and second backup paths 171 and 172. Accordingly, each flow path between the master cylinder 110 and the first and second cut valves 173 and 174 forms a closed circuit.

A hydraulic flow is generated in directions shown by arrows in FIG. 3 according to a series of operations of the above-described components.

In addition, the ECU 106 simultaneously opens the apply valves 141 and 142, closes the first and second cut valves 173 and 174, and opens the simulation valve 186 of the pedal simulator 180 to generate a pressure of the pedal simulator 180. The pressure generated by pressing the master cylinder 110 according to a pedal effort of the brake pedal 30 is transferred to the pedal simulator 180 connected to the master cylinder 110. When the simulation valve 186 is opened, the hydraulic pressure is supplied to the simulation chamber 182. The hydraulic pressure supplied to the simulation chamber 182 moves the piston 183. While a load is applied to the elastic member 184 such as a spring that supports the piston 183 by the piston 183 moving, a pressure corresponding to the load is generated in the simulation chamber 182. The pressure is a pressure of the pedal simulator 180 and functions as a pedal effort of the brake pedal 30 to provide the driver with a suitable pedal sensation.

Meanwhile, when the cut valves 173 and 174 are normal, a pressure introduced from the accumulator 120 to the first and second hydraulic paths 141 and 142 is maintained by the first and second cut valves 173 and 174 being blocked due to the apply valves 141 and 142 being opened.

However, when a mechanical leak failure of the cut valves 173 and 174 occurs, pressures of the first and second hydraulic paths 131 and 132 are not maintained and some of the hydraulic pressure is introduced to each of the backup paths 171 and 172 along the cut valves 173 and 174. The output rod of the master cylinder may strike the input rod due to the hydraulic pressure being introduced as described above. A kick back phenomena in which a physical impact is transferred to the brake pedal connected to the input rod by the output rod striking the input rod occurs. That is, when a leak failure of the cut valves 173 and 174 occurs, the kick back phenomena in which pressures of the first and second hydraulic paths 131 and 132 are transferred to the pedal simulator 180 and push the brake pedal 30 back occurs. The driver may feel vibrations striking the brake pedal and may feel discomfort.

At this point, pressures of the first hydraulic circuit 131 and the pedal simulator 180 are synchronized when a leak failure of the first cut valve 173 occurs, and pressures of the second hydraulic circuit 132 and the pedal simulator 180 are synchronized when a leak failure of the second cut valve 174 occurs.

In the present disclosure, when the AHB operates and the cut valves 173 and 174 have a failure, the mechanical leak failure of the cut valves 173 and 174 is detected using a correlation between a pressure of each of the first and second hydraulic circuits 131 and 132 and a pressure of the pedal simulator 180.

For example, when the first cut valve 173 is normal and a target pressure P corresponding to a pedal stroke is in a range of P1 to P2 (P1<P<P2) while the AHB operates, a pressure $P_{PSP}$ of the pedal simulator 180 is less than a level of, for instance, 50% of a pressure $P_{BC1}$ of the first hydraulic circuit 131. Similarly, when the second cut valve 174 is normal and the target pressure P corresponding to the pedal stroke is in the range of P1 to P2 (P1<P<P2), the pressure $P_{PSP}$ of the pedal simulator 180 is less than a level of, for instance, 50% of a pressure $P_{BC2}$ of the second hydraulic circuit 132.

Accordingly, when the pressure $P_{PSP}$ of the pedal simulator 180 is greater than a level of, for instance, a preset first ratio X % of the pressure $P_{BC1}$ of the first hydraulic circuit 131, it may be determined that there is a high possibility of a mechanical leak failure of the first cut valve 173. Similarly, when the pressure $P_{PSP}$ of the pedal simulator 180 is greater than the level of, for instance, the preset first ratio X % of the pressure $P_{BC2}$ of the second hydraulic circuit 132, it may be determined that there is a high possibility of a mechanical leak failure of the second cut valve 174.

Meanwhile, when the first cut valve 173 is normal and the target pressure P corresponding to a pedal stroke is in a range of P2 to P4 (P2<P<P4) while the AHB operates, the pressure $P_{PSP}$ of the pedal simulator 180 is less than a level, for instance, in a range of 20 to 30% of the pressure $P_{BC1}$ of the first hydraulic circuit 131. Similarly, when the second cut valve 174 is normal and the target pressure P corresponding to the pedal stroke is in the range of P2 to P4 (P2<P<P4), the pressure $P_{PSP}$ of the pedal simulator 180 is less than a level, for instance, in a range of 20 to 30% of the pressure $P_{BC2}$ of the second hydraulic circuit 132.

Accordingly, when the pressure $P_{PSP}$ of the pedal simulator 180 is greater than a level of, for instance, a preset second ratio Y % (X %>Y %) of the pressure $P_{BC1}$ of the first hydraulic circuit 131, it may be determined that there is a high possibility of a mechanical leak failure of the first cut valve 173. Similarly, when the pressure $P_{PSP}$ of the pedal simulator 180 is greater than the level of, for instance, the preset first ratio Y % of the pressure $P_{BC2}$ of the second hydraulic circuit 132, it may be determined that there is a high possibility of a mechanical leak failure of the second cut valve 174.

Here, the determination of whether the target pressure P is in the range of P1 to P2 is for preventing a false detection that may occur when there is a pressure offset in the pedal simulator 180.

In addition, the determination of whether the target pressure P is in the range of P2 to P4 is done in consideration of the face that the pressure $P_{PSP}$ of the pedal simulator 180 and the pressure $P_{BC1}$ of the first hydraulic circuit 131 (or, the pressure $P_{BC2}$ of the second hydraulic circuit 132) may reach an approximate maximum pressure when the driver steps on the brake pedal 30 to a maximum extent.

In addition, the ECU 106 may compare a pedal pressure value estimated from the pressure $P_{PSP}$ of the pedal simulator 180 with a pedal pressure detected by the pedal stroke sensor 105 that detects a pedal stroke of the brake pedal 30.

Specifically, the estimated pedal pressure value obtained from a pressure of the pedal simulator may be estimated according to a preset table (not shown).

Here, when the ECU 106 determines whether a mechanical leak failure of the cut valves 173 and 174 occurs using correlations between a pressure of the pedal simulator 180 and pressures of the hydraulic paths, the ECU 106 may additionally determine a mechanical leak failure of the cut valves has occurred when a difference between a pedal pressure value estimated from the pressure $P_{PSP}$ of the pedal simulator 180 and a pedal pressure value detected by the pedal stroke sensor is greater than a preset third reference value.

Specifically, the ECU 106 may determine a mechanical leak failure of the cut valves has occurred when a ratio of a pedal pressure value estimated from the pressure $P_{PSP}$ of the pedal simulator 180 to a pedal pressure value detected by the pedal stroke sensor is greater than a preset multiple.

At this point, when a mechanical leak failure of a corresponding cut valve 173 or 174 is determined to have occurred, the ECU 106 re-determines whether it is the mechanical leak failure of the corresponding cut valve 173 or 174 by applying a pattern current to the corresponding cut valve.

Here, the applied pattern current may include a pattern in which a current is increased linearly from a predetermined minimum current to a predetermined maximum current for a predetermined critical time. When a corresponding cut valve is determined not to operate normally even after the pattern current is applied, the ECU 106 may control various electronic valves to warn the driver of a mechanical leak failure of the cut valves 173 and 174 through the warning unit 230 and to simultaneously perform emergency braking control to generate a brake pressure at each of the wheel cylinders 20 by the driver stepping on the brake pedal 30.

Figure 4:
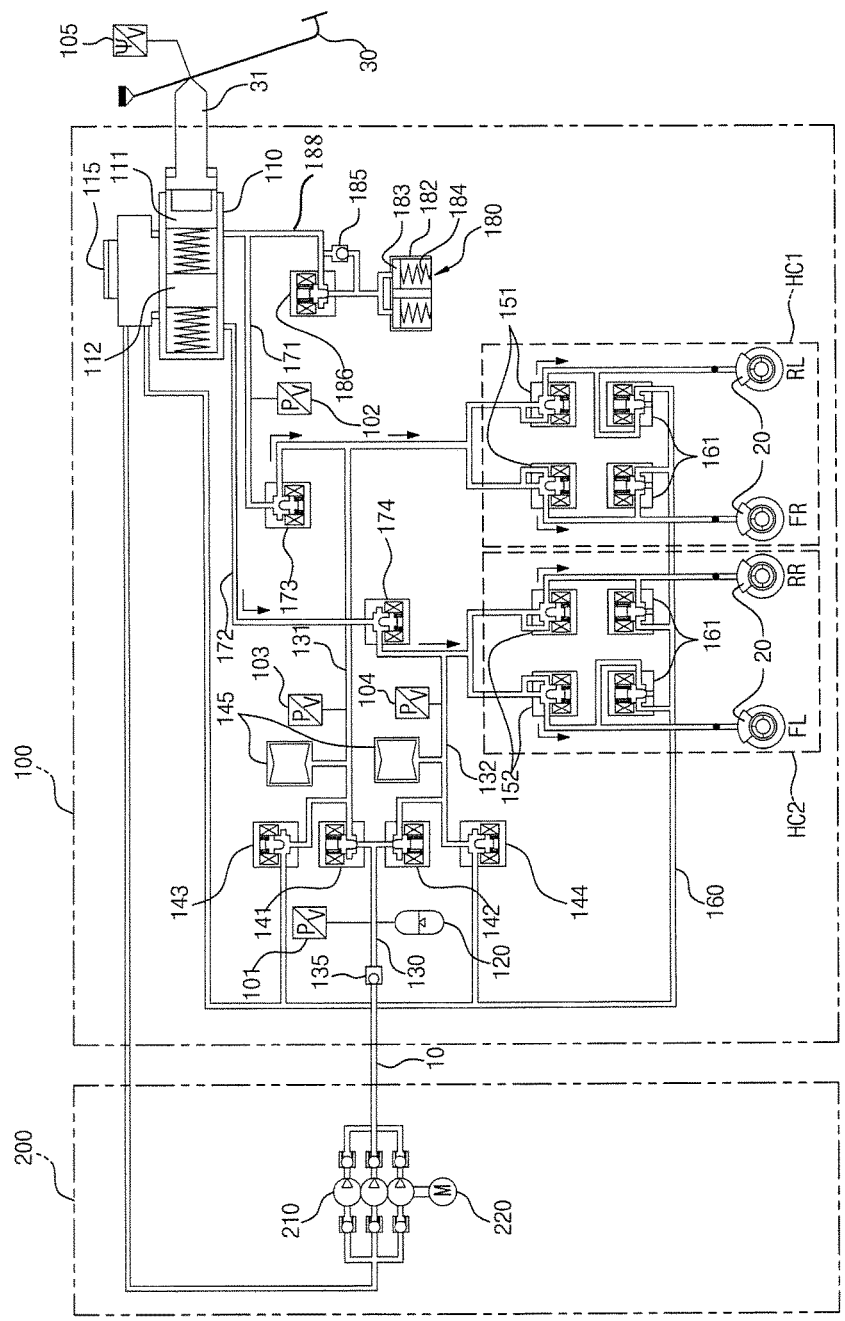
FIG. 4 is a hydraulic circuit diagram for describing a hydraulic flow of the electrically controlled brake system according to one embodiment of the present discloser during emergency braking.

FIG. 4 is a hydraulic circuit diagram for describing a hydraulic flow of the electrically controlled brake system according to one embodiment of the present discloser during emergency braking.

Referring to FIG. 4, when emergency braking control is required due to a mechanical leak failure of the cut valves 173 and 174, the ECU 106 switches the first and second cut valves 173 and 174 respectively installed on the first and second backup paths 171 and 172 to original open states thereof, and switches the first and second apply valves 141 and 142 and the first and second release valves 143 and 144 to original closed states thereof. Accordingly, a pressure of the master cylinder 110 generated by an operation of the brake pedal 30 may be directly transferred to each of the wheel cylinders 20 through the first and second backup paths 171 and 172 like a hydraulic flow in directions of arrows shown in FIG. 4. Accordingly, discomfort of a driver is reduced by preventing a kick back phenomena due to the mechanical leak failure of the cut valves 173 and 174.

Figure 5:
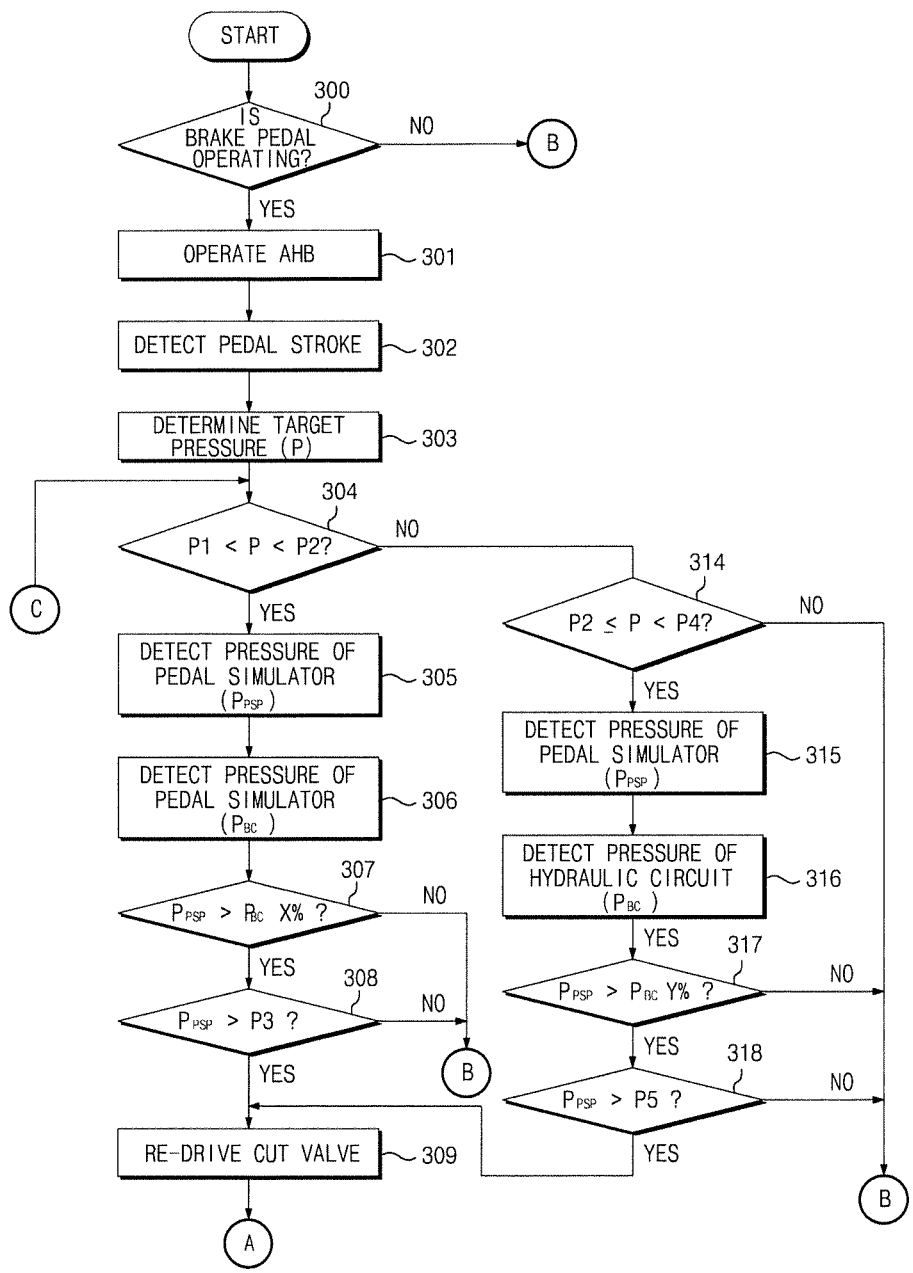
FIGS. 5 and 6 are control flow charts for describing a determination of a mechanical leak failure of a cut valve in the electronically controlled brake system according to one embodiment of the present disclosure.
Figure 6:
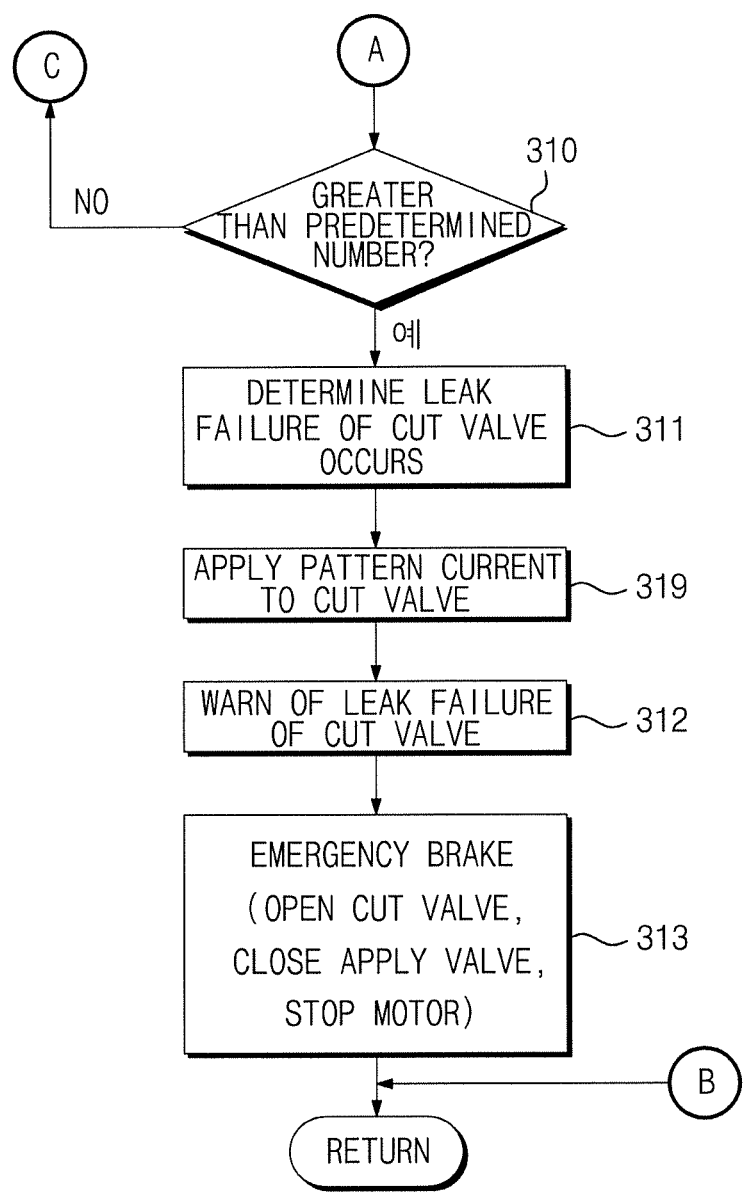

FIGS. 5 and 6 are control flow charts for describing a determination of a mechanical leak failure of a cut valve in the electrically controlled brake system according to one embodiment of the present disclosure.

Referring to FIGS. 5 and 6, first, when a driver steps on the brake pedal 30, the ECU 106 determines whether the brake pedal 30 operates (300). Here, the ECU may determine whether the brake pedal 30 operates based on a pedal stroke detected by the pedal stroke sensor 105.

When the determination result of operation mode 300 is that the brake pedal 30 is operating, the ECU 106 starts an AHB operation (301). The ECU 106 simultaneously detects a pedal stroke through the pedal stroke sensor 105 (302), and determines the target pressure P corresponding to the detected pedal stroke (303). The ECU 106 controls the AHB operation through various valve controls to generate the target pressure P. More specifically, the ECU 106 operates the motor 220 to fill the accumulator 120 with high pressure brake oil by an operation of the pump 210, opens the first and second apply valves 141 and 152 to supply the high pressure brake oil filled in the accumulator 120 to each of the wheel cylinders 20, closes the first and second cut valves 173 and 174 to respectively block the first and second backup paths 171 and 172, and opens the simulation valve 186 of the pedal simulator 180 to generate a pressure of the pedal simulator corresponding to a reaction force of the brake pedal (see FIG. 3).

The ECU 106 determines whether the target pressure P determined in operation mode 303 is in a pressure range of P1 to P2 (P1<P<P2) (304).

When the determination result of operation mode 304 is that the target pressure P is in the pressure range of P1 to P2 (P1<P<P2), the ECU 106 detects the pressure $P_{PSP}$ of the pedal simulator through the fourth pressure sensor 102 (305).

The ECU 106 simultaneously detects the pressure $P_{BC1}$ of the first hydraulic path 131 through the second pressure sensor 103 and detects the pressure $P_{BC2}$ of the second hydraulic path 132 through the third pressure sensor 104 (306).

In addition, whether the pressure $P_{PSP}$ of the pedal simulator 180 is greater than a level of, for instance, the preset first ratio X % of the pressure $P_{BC1}$ of the first hydraulic circuit 131 is determined, and whether the pressure $P_{PSP}$ of the pedal simulator 180 is greater than the level of, for instance, the preset first ratio X % of the pressure $P_{BC2}$ of the second hydraulic circuit 132 (307) is determined. The pressure $P_{PSP}$ of the pedal simulator is less than a level of, for instance, 50% of the pressure $P_{BC1}$ of the first hydraulic circuit when the first cut valve 173 is normal, and the pressure $P_{PSP}$ of the pedal simulator is less than a level of, for instance, 50% of the pressure $P_{BC2}$ of the second hydraulic circuit when the second cut valve 174 is normal.

When one of a case in which the pressure $P_{PSP}$ of the pedal simulator is greater than the level of the preset first ratio X % of the pressure $P_{BC1}$ of the first hydraulic circuit and a case in which the pressure $P_{PSP}$ of the pedal simulator is greater than the level of the preset first ratio X % of the pressure $P_{BC2}$ of the second hydraulic circuit is satisfied, the ECU 106 determines whether the pressure $P_{PSP}$ of the pedal simulator 180 is greater than a preset pressure P3 (308).

The case in which the pressure $P_{PSP}$ of the pedal simulator is greater than the level of the preset first ratio X % of the detected pressure $P_{BC1}$ of the first hydraulic circuit may occur even when the first cut valve 173 does not have a mechanical leak failure, and the case in which the pressure $P_{PSP}$ of the pedal simulator is greater than the level of the preset first ratio X % of the detected pressure $P_{BC2}$ of the second hydraulic circuit may occur even when the second cut valve 174 does not have a mechanical leak failure.

For example, when the pressure $P_{BC1}$ of the first hydraulic path is excessively low even though the pressure $P_{PSP}$ of the pedal simulator itself is not greater than a pressure value when a leak failure of the first cut valve 173 occurs, the pressure $P_{PSP}$ of the pedal simulator may be greater than the level of the preset first ratio X % of the pressure $P_{BC1}$ of the first hydraulic path, and when the pressure $P_{BC2}$ of the second hydraulic path is excessively low even though the pressure $P_{PSP}$ of the pedal simulator itself is not greater than a pressure value when a leak failure of the second cut valve 174 occurs, the pressure $P_{PSP}$ of the pedal simulator may be greater than the level of the preset first ratio X % of the pressure $P_{BC2}$ of the second hydraulic path. Accordingly, although the pressure $P_{PSP}$ of the pedal simulator is greater than the level of the preset first ratio X % of the pressure $P_{BC1}$ of the first hydraulic path or the pressure $P_{PSP}$ of the pedal simulator is greater than the level of the preset first ratio X % of the pressure $P_{BC2}$ of the second hydraulic path, whether the pressure $P_{PSP}$ of the pedal simulator is as much as a pressure through which a braking will of a driver is expressed, for instance, P3, needs to be determined.

When the determination result of operation mode 308 is that the pressure $P_{PSP}$ of the pedal simulator is greater than P3, the ECU 106 re-drives the corresponding cut valve 173 or 174 to reopen the corresponding cut valve 173 or 174 to determine whether a leak failure is caused by the corresponding cut valve 173 or 174 being temporarily mechanically stuck (309).

After the corresponding cut valve 173 or 174 is re-driven, the ECU 106 counts the number of re-drivings of the corresponding cut valve 173 or 174, and determines whether the counted number of re-drivings is equal to or greater than a predetermined number (310).

When the determination result of operation mode 310 is that the number of re-drivings of the corresponding cut valve 173 or 174 is less than the predetermined number, the operation mode returns to operation mode 304 and performs it and subsequent operation modes.

Meanwhile, when the determination result of operation mode 310 is that the number of re-drivings of the corresponding cut valve 173 or 174 is equal to or greater than the predetermined number, a mechanical leak failure of the corresponding cut valve 173 or 174 is determined to have occurred (311).

At this point, when the mechanical leak failure of the corresponding cut valve 173 or 174 is determined to have occurred, a pattern current is applied to the cut valve and whether the mechanical leak failure of the corresponding cut valve 173 or 174 has occurred is re-determined (319).

At this point, the applied pattern current may include a pattern in which a current is increased linearly from a predetermined minimum current to a predetermined maximum current for a predetermined critical time.

Specifically, a pattern of a driving current may include a pattern in which a driving current of the cut valve is increased linearly from a predetermined minimum current of 0 A to a predetermined maximum current of 2 A for the predetermined critical time.

For example, according to one embodiment of the present disclosure, while a vehicle is stopping, the ECU 106 may determine whether a mechanical leak failure of the cut valve occurs within 0.5 sec, and may control a redetermination operation to linearly apply a current from a minimum current value to a maximum driving current value for 2.5 sec.

In addition, while the vehicle is running, the ECU 106 may determine whether a mechanical leak failure of the cut valve occurs in 0.5 sec, and may control a redetermination operation to linearly apply a current from the minimum current value to the maximum driving current value for 0.5 sec with a sharp current inclination. Accordingly, the ECU 106 may sensitively re-determine whether a failure of the cut valve has occurred when the vehicle is running.

When a mechanical failure of the corresponding cut valve 173 or 174 is determined to have occurred, the ECU 106 warns of the mechanical leak failure of the corresponding cut valve 173 or 174 through the warning unit 230 (312).

The mechanical leak failure of the corresponding cut valve 173 or 174 is warned of simultaneously with emergency braking being performed (313). More specifically, the ECU 106 switches the first and second cut valves 173 and 174 respectively installed on the first and second backup paths 171 and 172 to original open states thereof, and switches the first and second apply valves 141 and 142 and the first and second release valves 143 and 144 to original closed states thereof. Accordingly, since a pressure of the master cylinder 110 generated by an operation of the brake pedal 30 may be directly transferred to each of the wheel cylinders 20 through the first and second backup paths 171 and 172, stable braking may be performed (see FIG. 4).

Meanwhile, when the determination result of operation mode 304 is that the target pressure P is in a pressure range of P2 to P4 (P2≤P<P4) is determined (314).

When the determination result of operation mode 314 is that the determined target pressure P is in the pressure range of P2 to P4 (P2≤P<P4), the ECU 106 detects the pressure $P_{PSP}$ of the pedal simulator through the fourth pressure sensor 102 (315).

The ECU 106 simultaneously detects the pressure $P_{BC1}$ of the first hydraulic path 131 through the second pressure sensor 103, and detects the pressure $P_{BC2}$ of the second hydraulic path 132 through the third pressure sensor 104 (316).

In addition, whether the pressure $P_{PSP}$ of the pedal simulator 180 is greater than the level of, for instance, the preset second ratio Y % of the pressure $P_{BC1}$ of the first hydraulic circuit 131 is determined and whether the pressure $P_{PSP}$ of the pedal simulator 180 is greater than the level of, for instance, the preset second ratio Y % of the pressure $P_{BC2}$ of the second hydraulic circuit 132 is determined (317). The pressure $P_{PSP}$ of the pedal simulator is less than a level in a range of 20 to 30% of the pressure $P_{BC1}$ of the first hydraulic circuit when the first cut valve 173 is normal, and the pressure $P_{PSP}$ of the pedal simulator 180 is less than a level in a range of 20 to 30% of the pressure $P_{BC2}$ of the second hydraulic circuit when the second cut valve 174 is normal.

When one of a case in which the pressure $P_{PSP}$ of the pedal simulator is greater than the level of the preset second ratio Y % of the pressure $P_{BC1}$ of the first hydraulic circuit and a case in which the pressure $P_{PSP}$ of the pedal simulator is greater than the level of the preset second ratio Y % of the pressure $P_{BC2}$ of the second hydraulic circuit is satisfied, the ECU 106 determines whether the pressure $P_{PSP}$ of the pedal simulator 180 is greater than a preset pressure P5 (P5>P3) (318).

The case in which the pressure $P_{PSP}$ of the pedal simulator is greater than the level of the preset second ratio Y % of the detected pressure $P_{BC1}$ of the first hydraulic path may occur even when the first cut valve 173 does not have a mechanical leak failure, and the case in which the pressure $P_{PSP}$ of the pedal simulator is greater than the level of the preset second ratio Y % of the detected pressure $P_{BC2}$ of the second hydraulic path may occur even when the second cut valve 174 does not have a mechanical leak failure.

For example, when the pressure $P_{BC1}$ of the first hydraulic path is excessively low even though the pressure $P_{PSP}$ of the pedal simulator itself is not greater than a pressure value when a leak failure of the first cut valve 173 occurs, the pressure $P_{PSP}$ of the pedal simulator may be greater than the level of the preset second ratio Y % of the pressure $P_{BC1}$ of the first hydraulic path, and when the pressure $P_{BC2}$ of the second hydraulic path is excessively low even though the pressure $P_{PSP}$ of the pedal simulator itself is not greater than a pressure value when a leak failure of the second cut valve 174 occurs, the pressure $P_{PSP}$ of the pedal simulator may be greater than the level of the preset second ratio Y % of the pressure $P_{BC2}$ of the second hydraulic path. Accordingly, although the pressure $P_{PSP}$ of the pedal simulator is greater than the level of the preset second ratio Y % of the pressure $P_{BC1}$ of the first hydraulic path or the pressure $P_{PSP}$ of the pedal simulator is greater than the level of the preset second ratio Y % of the pressure $P_{BC2}$ of the second hydraulic circuit, whether the pressure $P_{PSP}$ of the pedal simulator is greater than, for instance, P6 needs to be determined. Accordingly, as the target pressure P corresponding to a pedal stroke rises, a pressure ratio to the pressure $P_{BC1}$ of the first hydraulic circuit or the pressure $P_{BC2}$ of the second hydraulic circuit is decreased (from X % to Y %), and a pressure compared with the pressure $P_{PSP}$ of the pedal simulator is increased (from P3 to P5).

When the determination result of operation mode 318 is that the pressure $P_{PSP}$ of the pedal simulator is greater than P5, the ECU 106 re-drives the corresponding cut valve 173 or 174 to reopen the corresponding cut valve 173 or 174 to determine whether a leak failure is caused by the corresponding cut valve 173 or 174 being temporarily mechanically stuck (309).

After the corresponding cut valve 173 or 174 is re-driven, the ECU 106 counts the number of re-drivings of the corresponding cut valve 173 or 174, and determines whether the counted number of re-drivings is equal to or greater than a predetermined number (310).

When the determination result of operation mode 310 is that the number of re-drivings of the corresponding cut valve 173 or 174 is less than the predetermined number, the operation mode returns to operation mode 304 and performs it and subsequent operation modes are performed.

Meanwhile, when the determination result of operation mode 310 is that the number of re-drivings of the corresponding cut valve 173 or 174 is equal to or greater than the predetermined number, a mechanical leak failure of the corresponding cut valve 173 or 174 is determined to have occurred (311).

When a mechanical leak failure of the corresponding cut valve 173 or 174 is determined to have occurred, the ECU 106 warns of the mechanical leak failure of the corresponding cut valve 173 or 174 through the warning unit 230 (312).

The mechanical leak failure of the corresponding cut valve 173 or 174 is warned of simultaneously with emergency braking being performed (313).

As is apparent from the above description, an electrically controlled brake system in accordance with one embodiment of the present disclosure can prohibit all valves of the system from being driven by detecting a mechanical leak failure of cut valves using correlations between pressures of boost circuits (BCs) and a pedal simulator, can prevent a kick back phenomenon of a brake pedal due to a mechanical leak failure of the cut valves by switching such that a braking operation is directly performed by a force applied by a driver when the drive steps on the brake pedal, can inform the driver of a mechanical leak failure of the cut valves, and can thus improve ride comfort and running stability of the driver.

As described above, while the present disclosure has been described with reference to specific embodiments and drawings, the present disclosure is not limited thereto. It should be clear to those skilled in the art that various modifications and alterations may be made without departing from the spirit and scope of the present disclosure and equivalents of the appended claims.

REFERENCE NUMERALS

| | |
|---|---|
| 100: HYDRAULIC CONTROL UNIT | 101, 102, 103, 104: PRESSURE SENSOR |
| 105: PEDAL STROKE SENSOR | 106: ELECTRONIC CONTROL UNIT (ECU) |
| 110: MASTER CYLINDER | 120: ACCUMULATOR |
| 130: CONNECTION PATH | 131: FIRST INFLOW PATH |
| 132: SECOND INFLOW PATH | 135: CHECK VALVE |
| 141: FIRST APPLY VALVE | 142: SECOND APPLY VALVE |
| 160: RETURN PATH | 171: FIRST BACKUP PATH |
| 172: SECOND BACKUP PATH | 173: FIRST CUT VALVE |
| 174: SECOND CUT VALVE | 180: PEDAL SIMULATOR |
| 185: SIMULATION CHECK VALVE | 186: SIMULATION VALVE |
| 200: POWER SOURCE UNIT | 210: PUMP |
| 220: MOTOR | 230: WARNING UNIT |

What is claimed is:

1. An electrically controlled brake system comprising:
    a motor and a pump;
    a master cylinder;
    a reservoir that is coupled to an upper portion of the master cylinder and in which a brake fluid is stored;
    an accumulator in which a brake fluid pumped from the reservoir is stored by the motor and the pump;
    a hydraulic path that connects the accumulator and each of wheel cylinders;
    an apply valve and a release valve that are provided on the hydraulic path and control a hydraulic pressure transferred from the accumulator to each of the wheel cylinders;
    a pedal simulator including a simulation chamber connected to the master cylinder and configured to store a brake fluid flowing from the master cylinder to provide a reaction force of a brake pedal, and a simulation valve provided at an inlet of the simulation chamber;
    a backup path that is connected to the hydraulic path and connects the master cylinder and each of the wheel cylinders;
    a cut valve that is provided on the backup path and blocks the backup path;
    a first pressure sensor that is provided on the backup path and detects a pressure of the pedal simulator;
    a second pressure sensor that is provided on the hydraulic path and detects a pressure of the hydraulic path; and
    an electronic control unit (ECU) that determines whether a mechanical leak failure of the cut valve occurs using a correlation between the pressure of the pedal simulator detected by the first pressure sensor and the pressure of the hydraulic path detected by the second pressure sensor.

2. The electrically controlled brake system of claim 1, wherein, when a pressure ratio of the detected pressure of the pedal simulator and the detected pressure of the hydraulic path is greater than a pressure ratio when the cut valve is normal, and when the detected pressure of the pedal simulator is greater than a preset first reference value, the ECU determines that a mechanical leak failure of the cut valve occurs.

3. The electrically controlled brake system of claim 2, wherein, when a ratio of the detected pressure of the pedal simulator and the detected pressure of hydraulic path is greater than a preset ratio, and when the detected pressure of the pedal simulator is greater than the preset first reference value, the ECU determines that a mechanical leak failure of the cut valve occurs.

4. The electrically controlled brake system of claim 3, further comprising a pedal stroke sensor that detects a pedal stroke of the brake pedal,
    wherein, as a target pressure corresponding to the pedal stroke detected by the pedal stroke sensor rises, the ECU decreases the preset ratio and increases the preset first reference value.

5. The electrically controlled brake system of claim 2, further comprising a warning unit that warns of a mechanical leak failure of the cut valve,
    wherein, when the failure of the cut valve is determined to occur, the ECU repeats re-driving of the cut valve and re-performing the determination of whether the failure of the cut valve occurs, and when the number of the re-drivings is equal to or greater than a preset number, the ECU warns of the mechanical leak failure of the cut valve through the warning unit.

6. The electrically controlled brake system of claim 1, wherein the cut valve includes a normally open solenoid valve which usually maintains an open state.

7. The electrically controlled brake system of claim 4, wherein, when a difference between a pedal pressure value estimated from the detected pressure of the pedal simulator and a pedal pressure value detected by the pedal stroke sensor is greater than a preset third reference value, the ECU determines that a mechanical leak failure of the cut valve occurs.

8. The electrically controlled brake system of claim 7, wherein, when a ratio of the pedal pressure value estimated from the detected pressure of the pedal simulator and the pedal pressure value detected by the pedal stroke sensor is greater than a preset multiple, the ECU determines that a mechanical leak failure of the cut valve occurs.

9. The electrically controlled brake system of claim 8, wherein, when a mechanical leak failure of the cut valve is determined to occur, the ECU applies a pattern current to the cut valve and re-determines whether the mechanical leak failure of the cut valve occurs.

10. The electrically controlled brake system of claim 9, wherein the pattern current includes a pattern in which a current is increased linearly from a preset minimum current to a preset maximum current for a preset critical time.

11. An electrically controlled brake system including an accumulator for storing a brake fluid pumped by a motor and a pump, a hydraulic path connecting the accumulator and each wheel cylinder, a pedal simulator having a simulation chamber connected to a master cylinder and configured to store a brake fluid flowing from the master cylinder to provide a reaction force of a brake pedal, and a simulation valve provided at an inlet of the simulation chamber, a backup path connected to the hydraulic path and connecting the master cylinder and each of the wheel cylinders, and a cut valve provided on the backup path and configured to block the backup path, the electrically controlled brake system comprising:

a first pressure sensor that is provided on the backup path and detects a pressure of the pedal simulator;
a second pressure sensor that is provided on the hydraulic path and detects a pressure of the hydraulic path;
a pedal stroke sensor that detects a pedal stroke of the brake pedal; and
an electronic control unit (ECU) that determines that a mechanical leak failure of the cut valve occurs when a ratio of the pressure of the pedal simulator detected by the first pressure sensor and the pressure of the hydraulic path detected by the second pressure sensor is greater than a preset ratio and when the detected pressure of the pedal simulator is greater than a preset value.

12. An electrically controlled brake system of claim 11, wherein, when a ratio of a pedal pressure value estimated from the pressure of the pedal simulator detected by the first pressure sensor and a pedal pressure value detected by the pedal stroke sensor is greater than a preset multiple, the ECU determines that a mechanical leak failure of the cut valve occurs.

13. An electrically controlled brake system of claim 12, wherein, when the mechanical leak failure of the cut valve is determined to occur, the ECU applies a pattern current to the cut valve and re-determines whether the mechanical leak failure of the cut valve occurs.

* * * * *